(12) United States Patent
Alvarado et al.

(10) Patent No.: US 11,029,914 B2
(45) Date of Patent: Jun. 8, 2021

(54) MULTI-CORE AUDIO PROCESSOR WITH PHASE COHERENCY

(71) Applicant: KNOWLES ELECTRONICS, LLC, Itasca, IL (US)

(72) Inventors: Erick Alvarado, Mountain View, CA (US); David Rossum, Mountain View, CA (US)

(73) Assignee: Knowles Electronics, LLC, Itasca, IL (US)

( * ) Notice: Subject to any disclaimer, the term of this patent is extended or adjusted under 35 U.S.C. 154(b) by 0 days.

(21) Appl. No.: 16/650,845

(22) PCT Filed: Sep. 24, 2018

(86) PCT No.: PCT/US2018/052340
§ 371 (c)(1),
(2) Date: Mar. 25, 2020

(87) PCT Pub. No.: WO2019/067335
PCT Pub. Date: Apr. 4, 2019

(65) Prior Publication Data
US 2020/0264831 A1 Aug. 20, 2020

Related U.S. Application Data

(60) Provisional application No. 62/566,140, filed on Sep. 29, 2017.

(51) Int. Cl.
*G06F 3/16* (2006.01)
*G06F 13/40* (2006.01)

(52) U.S. Cl.
CPC .......... *G06F 3/162* (2013.01); *G06F 13/4068* (2013.01)

(58) Field of Classification Search
CPC .. G06F 3/162; G06F 9/30036; G06F 13/4068; G06F 3/165; G06F 3/16
See application file for complete search history.

(56) References Cited

U.S. PATENT DOCUMENTS

| | | | |
|---|---|---|---|
| 7,334,132 B1 * | 2/2008 | Kumar | H04N 7/163 348/E7.056 |
| 8,750,526 B1 | 6/2014 | Santos et al. | |

(Continued)

FOREIGN PATENT DOCUMENTS

WO    WO-2016/130520 A1    8/2016

OTHER PUBLICATIONS

International Search Report and Written Opinion, PCT/US2018/052340, Knowles Electronics, LLC (dated Jan. 15, 2019).

*Primary Examiner* — Fan S Tsang
*Assistant Examiner* — David Siegel
(74) *Attorney, Agent, or Firm* — Foley & Lardner LLP (57) ABSTRACT

A multi-core audio processor includes a plurality of data ports configured to receive and transmit data, wherein a first data port of the plurality of data ports is configured to receive data associated with a first stream, a first plurality of audio interface resources configured to perform operations on the data, and a multiplexing unit configured to route data between the plurality of data ports and the first plurality of audio interface resources, the multiplexing unit including a multiplexer associated with each of the first plurality of audio interface resources. The multi-core audio processor also includes a first plurality of transport buffers, at least one transport buffer associated with each of the first plurality of audio interface resources. A first set of buffers of the first plurality of transport buffers is configured to synchronously store data received from the first set of the first plurality of audio interface resources.

20 Claims, 5 Drawing Sheets

(56) References Cited

U.S. PATENT DOCUMENTS

| | | |
|---|---|---|
| 9,508,345 B1 | 11/2016 | Murgia |
| 9,640,194 B1 | 5/2017 | Nemala et al. |
| 2001/0024456 A1* | 9/2001 | Zaun ............... H04N 7/52 370/535 |
| 2007/0010999 A1 | 1/2007 | Klein et al. |
| 2010/0094643 A1 | 4/2010 | Avendano et al. |
| 2012/0010881 A1 | 1/2012 | Avendano et al. |
| 2016/0295221 A1* | 10/2016 | Altmann .......... H04N 21/42623 |
| 2018/0081854 A1* | 3/2018 | Joy .................. G06F 13/28 |

* cited by examiner

FIG. 5

MULTI-CORE AUDIO PROCESSOR WITH PHASE COHERENCY

CROSS-REFERENCE TO RELATED APPLICATIONS

This application is a National Stage Application of PCT/US2018/052340, filed Sep. 24, 2018, which claims the benefit of and priority to U.S. Provisional Patent Application No. 62/566,140, filed Sep. 29, 2017, the entire contents of which are incorporated herein by reference.

BACKGROUND

While beneficial from a cost and power usage-perspective, the use of re-configurable hardware in an audio interface can introduce complexity into digital signal (e.g., audio) processing. For example, when receiving a data (e.g., audio) stream, the re-configurable hardware can create difficulties in terms of maintaining coherency between channels of the data stream. Known systems fail to provide both re-configurability of hardware resources and the maintenance of coherency.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

Referring generally to the figures, described herein is a multi-core audio processor including an audio transport block and an audio fabric block. The audio transport block includes a plurality of data ports and audio interfaces configured to receive and transmit streams of data (e.g., audio streams) to and from external audio devices. In addition to the audio interfaces, the audio transport block may include a set of audio interface resources configured to perform operations on the streams after their reception prior to their transmission. For example, the audio transport block may include a plurality of decimation filters communicably coupled to a set of pulse density modulation (PDM) interfaces via a plurality of multiplexers. Each PDM interface may be communicably coupled to every one of the multiplexers to enable selective routing of channels in streams received via the PDM interfaces to the decimation filters. Such a configuration enables different groupings of decimation filters to be allocated to a particular PDM interface depending on a number of channels contained in a stream received via the PDM interface. In other words, different groupings of the audio interface resources may be allocated to different streams depending on needs of the user. This provides flexibility for various audio processing applications.

As described herein, the term "audio interface resource" is meant to encompass hard-wired resources performing operations on physical streams received or transmitted via different audio interfaces. For example, audio interface resources associated with a pulse density modulation (PDM) interface may include decimation filters configured to downsample channels of data contained in a received physical stream by the PDM interface. In another example, audio interface resources associated with a pulse code modulation (PCM) interface may include counters in a serial data interface. Any allocable hardware resource used in conjunction with any audio interface may be described as an audio interface resource consistent with the systems and methods described herein.

In another aspect, the multi-core audio processor also includes a plurality of transport buffers disposed between the audio fabric block and the audio transport block. Each transport buffer includes a number of individual buffers configured to store constituent channels of the streams communicated to and from the multi-core audio processor. Groupings of the individual buffers of the transport buffers are configured to synchronously store data. Thus if one such grouping is allocated to a coherent stream, the synchronous storing maintains the coherency between channels of the stream. The transport buffers may include a programmable head of stream register configured to control the groupings of buffers that synchronously store data. As such, the groupings of buffers may be re-configured to support streams having differing characteristics.

In another aspect, the audio fabric block including a programmable register module storing a physical-to-logical address map. The physical-to-logical address map stores identifiers of physical streams in association with a logical address scheme. The audio fabric block is communicably coupled to a plurality of audio processing cores, and further includes a routing multiplexer configured to route data to the plurality of audio processing cores in response to receiving logical addresses from the audio processing cores. Thus, the audio fabric block enables the audio processing cores to retrieve coherently stored data associated with various streams. As a result, the processing cores needn't perform operations to render audio data of the streams coherent prior to performing other processing tasks thereon, facilitating the efficient processing of audio data for any suitable application.

Figure 1:
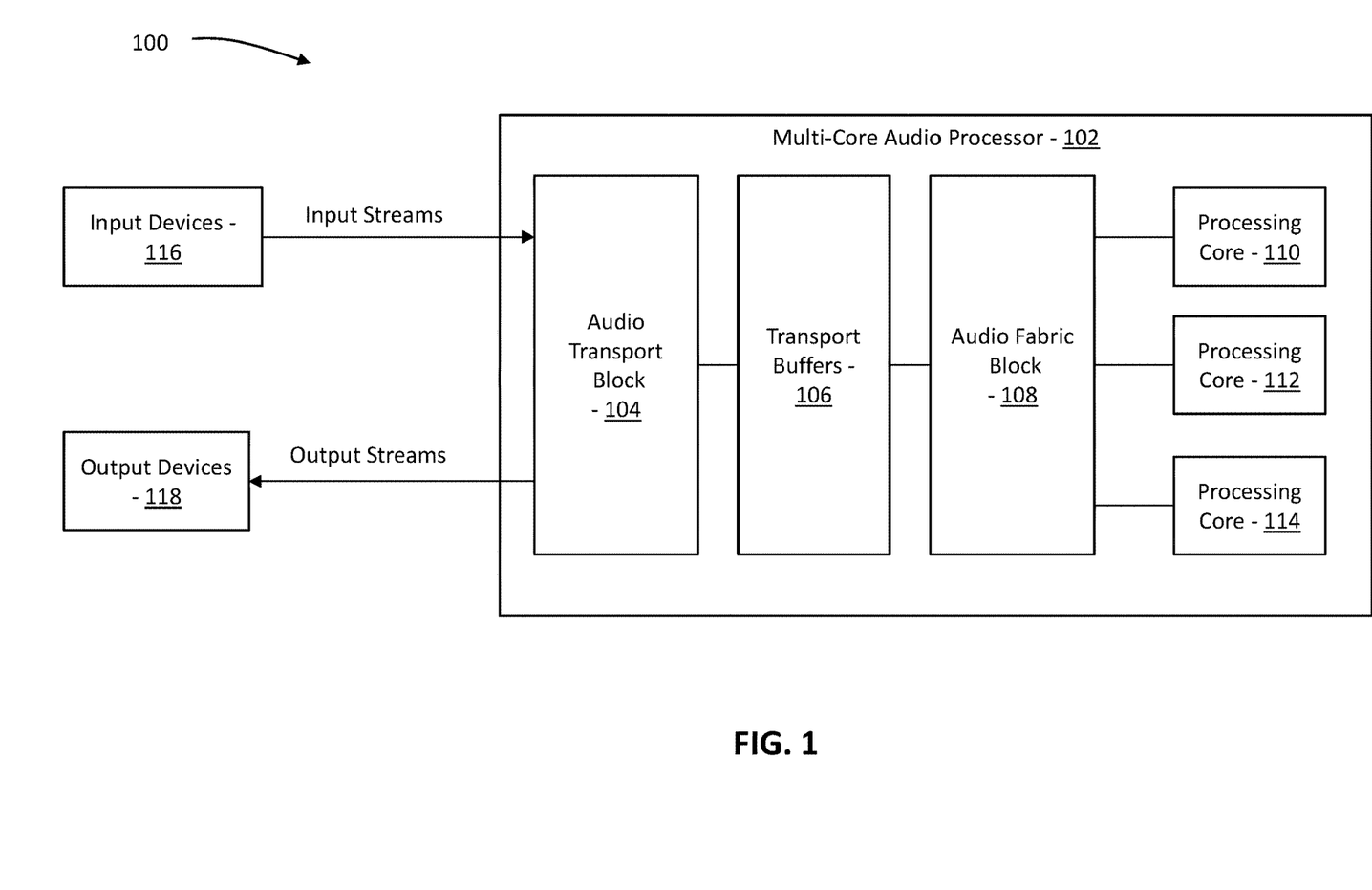
FIG. 1 is a block diagram of an environment of a multi-core audio processor.

Referring now to FIG. 1, an environment 100 including a multi-core audio processor 102 is shown, according to an example embodiment. Generally, the multi-core audio processor 102 is configured to receive input streams of data (e.g., audio data) from a plurality of input devices, perform various processing tasks (e.g., noise cancellation, filtering, etc.) on the input streams via a plurality of processing cores 110, 112, and 114, and transmit output streams of data to at least one output device 118. The streams of data communicated between the multi-core audio processor 102 and external devices (e.g., the input devices 116 and the output devices 118) are referred to herein as "physical streams."

The input devices 116 may communicate input physical streams to the multi-core audio processor 102 having a variety of different characteristics. For example, a first input device 116 may input a physical stream of a first data type (e.g., pulse code modulation-encoded data) and a second input device 116 may input a physical stream of a second data type (e.g., pulse density modulation-encoded data). To facilitate the processing of such a variety of data types, the multi-core audio processor 102 includes an audio transport block 104. The audio transport block 104 includes a plurality of different types of interfaces (e.g., audio interfaces) configured to perform operations (e.g., serialization and deserialization, filtering, etc.) on streams after their reception from the input devices 116 and prior to their transmittal to the output devices 118 (e.g., via data ports). For example, in one embodiment, the audio transport block 104 includes a plurality of PCM interfaces and a plurality of PDM interfaces configured to serialize and de-serialize constituent channels of the streams received via the input devices 116 and processed via the processing cores 110, 112, and 114.

Additionally, the audio transport block 104 may also include additional audio interface resources associated with all or a portion of the audio interfaces contained therein. The audio interface resources may perform various operations on the constituent channels of the streams to render them, for example, in a suitable format for processing via the processing cores 110, 112, and 114. In various embodiments, the audio transport block 104 includes a plurality of decimation filters configured to down-sample constituent channels of streams received via PDM interfaces. The down-sampling basically re-encodes the PDM streams into a PCM format such that the processing cores 110, 112, and 114 may treat each stream the same.

The physical streams input to the multi-core audio processor 102 may also vary in the number of constituent channels that they contain. For example, a first user may input three PDM streams into the multi-core audio processor 102: a first stream and a second stream each having two channels and a third stream having four channels. A second user, however, may only input two PDM streams into the multi-core audio processer, with each having four streams. In this example, these users having different audio interface resource requirements. The first user, for example, requires that two decimation filters be allocated to the first and second streams and four decimations filters be allocated to the third stream, while the second user, in contrast, requires that four decimation filters be allocated to each stream. To facilitate such alternative configurations, the audio transport block 104 includes a plurality of multiplexers coupling the audio interfaces to associated audio interface resources. Each output of each audio interface may be communicably coupled to multiple multiplexers such that different groupings of audio interface resources may be allocated to different streams without changing the wiring of the audio transport block 104. Such a structure facilitates compatibility with a variety of different user requirements.

In various embodiments, the physical streams input to the multi-core audio processor 102 each include a plurality of coherent channels having the same sampling rate. To facilitate low latency processing of the streams, it is desirable to maintain this coherency when storing samples of the streams in queues for processing. In this regard, the multi-core audio processor 102 further includes a plurality of transport buffers 106. In some embodiments, the multi-core audio processor 102 includes a transport buffer for each audio interface included in the audio transport block 104. In some embodiments, each transport buffer includes a plurality of asynchronous first-in-first-out (FIFO) buffers. Groupings of the FIFO buffers may be coupled to one another so as to synchronously store data of constituent channels of various streams to maintain the coherency of the constituent streams. As described herein, each transport buffer may include a programmable head of stream (HOS) register configured to set groupings of the individual FIFO buffers that are associated with each physical stream.

As described herein, each physical stream has an associated identifier. The identifier for a stream may be correlated with the audio interface used to communicate data of the stream. For example, in one embodiment, the audio transport block 104 include six PCM interfaces. If a stream is received by the sixth PCM interface, the stream identifier may identify that interface (e.g., PCM 6). In various embodiments, the multi-core audio processor also includes an audio fabric block 108 configured to store such identifiers in accordance with a logical address map. For example, each identifier may be stored in a location that identifies the grouping of FIFO buffers storing data of a corresponding stream. This way, upon receipt of an identifier (e.g., from one of the processing cores 110, 112, and 114), the audio fabric block 108 can route data to a requesting processing core. As such, the multi-core audio processor 102 is configurable to allocate different groupings of audio interface resources to different streams and to synchronously store such streams in processing queues in a manner that is logically addressable by the processing cores 110, 112, and 114.

The processing cores 110, 112, and 114 may be digital signal processing cores having different processing capabilities. For example, in one embodiment, the processing core 110 is a single sample processing including execution pipelines having instruction sets optimized for processing single samples of the input streams. The processing cores 112 and 114 may be block data processing cores (e.g., frame processing cores) including execution pipelines having instruction sets optimized for block data processing. For example, the processing core 112 may be a high performance frame processing core and the processing core may be a lower performance processing core. The multi-core audio processor 102 may further include non-digital signal processing cores, such as a main controller processor configured to arbitrate undedicated resources (e.g., memory) between the processing cores. The main control processor may be of an ARM architecture. Additionally, a system controller processing core may be configured to handle other tasks (e.g., system wakeup, power down, etc.).

In some embodiments, the processing core 110 is directly connected to the audio fabric block 108 via a native bus of the audio fabric block 108. The other processing cores may be communicably coupled to the audio fabric block by a processor interconnection structure. For example, the processor interconnection structure may couple each of the processing cores of the multi-core audio processor 102 to one another and be coupled to the audio fabric block 108 via a communications bridge.

Figure 2:
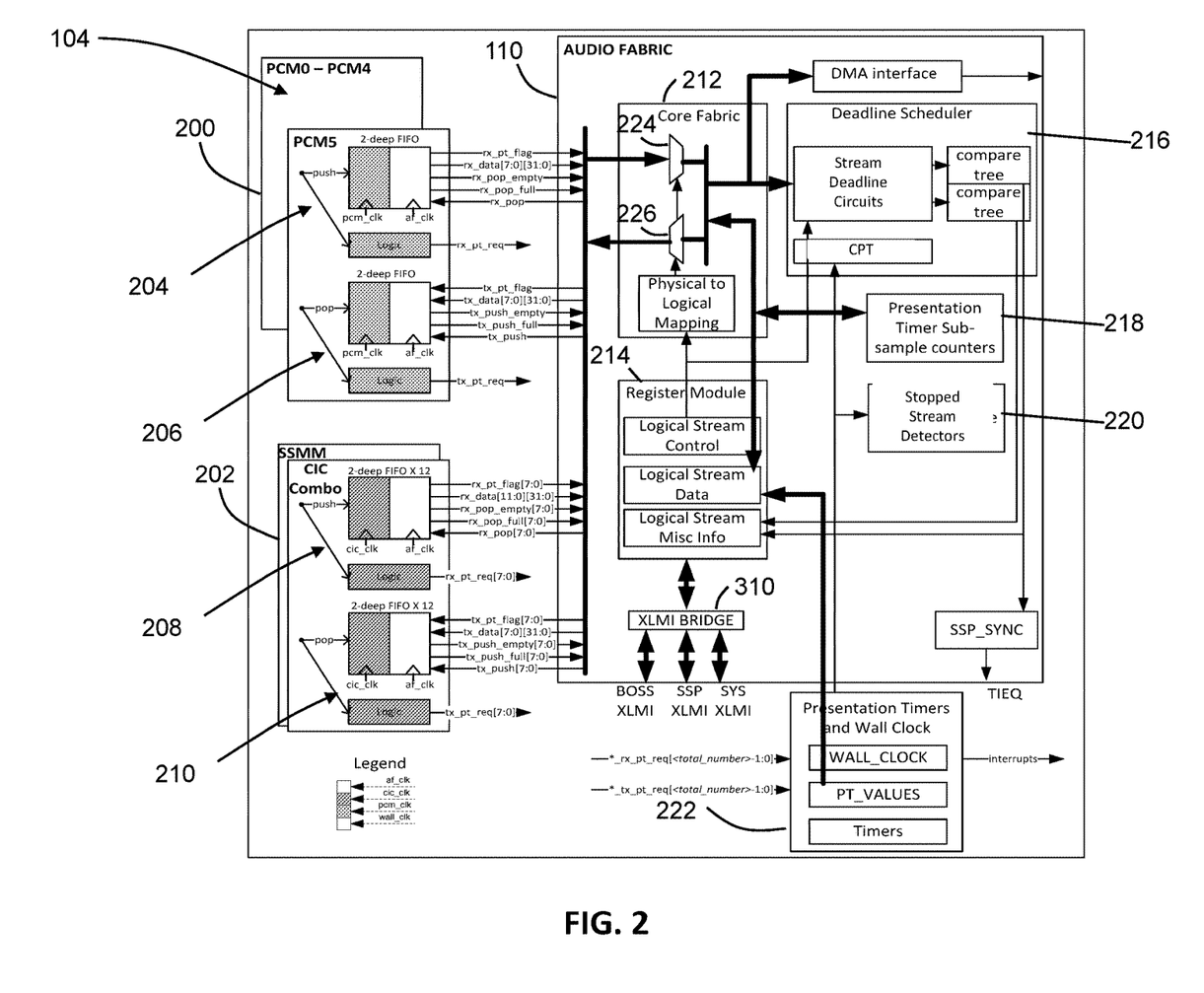
FIG. 2 is a schematic diagram of an audio fabric block and audio transport block of the multi-core audio processor shown in FIG. 1.

Referring now to FIG. 2, a schematic diagram providing a more detailed view of the audio transport block 104 and audio fabric block 108 described with respect to FIG. 1 is shown. As shown, the audio transport block 104 includes a first set of audio interfaces 200 (e.g., PCM interfaces) and a second set of audio interfaces 202 (e.g., PDM interfaces). While not depicted, additional audio interfaces (e.g., a SLIMbus interface) can also be included. One of the first set of audio interfaces 200 has a receiving transport buffer 204 and a transmittal transport buffer 206 associated therewith. In various embodiments, each audio interface of the first set of audio interfaces 200 has a corresponding receiving and transmitting transport buffer. The receiving transport buffer 204 and the transmittal transport buffer 206 are configurable to include a number of individual FIFO buffers. The number of individual FIFO buffers in a particular transport buffer may correspond to a number of constituent channels of an associated physical stream.

In various embodiments, these constituent channels of the physical streams are digital audio channels. A digital audio channel may be considered a monophonic digital audio signal having a sample rate. As such, the physical streams may be considered a set of one or more associated digital audio channels having the same sample rate (or more specifically, the same sample rate and sample aperture time); the set of samples associated with each channel of a stream may be considered a sample frame.

Channels belonging to the same stream may have consecutive numbers (e.g., corresponding to consecutive individual FIFO buffers in the receiving and transmitting transport buffers 204 and 206). The lowest numbered channel in a stream may be called the HOS. The individual FIFO buffer associated with the head of stream channel of a stream may be programmed to use its own pointer logic for control its read and write pointer and to export its read and write pointers to all other individual FIFO buffers associated with this stream. Because this arrangement may be programmable, it supports the variable assignment of channels into streams for audio interfaces. The operation of the HOS is described in more detail with respect to FIG. 4A.

In the example shown, the receiving and transmittal transport buffers 204 and 206 each have a storage depth of two (e.g., have a pair of data registers). As such, the receiving and transmittal transport buffers 204 and 206 (or individual buffers therein) may store up to two samples of audio data. The receiving and transmittal transport buffers 204 and 206 also include logic configured to control the reading and writing of data to and from the data registers. External devices may also control the read and write pointers.

In some embodiments, the individual FIFO buffers of the receiving and transmittal transport buffers 204 and 206 include a write data read output controlled by the write pointer. This write data read output may allow data resulting from the processing of a channel of a first stream to be written to the another FIFO buffer using a write command. When data resulting from the processing of a corresponding channel of a second stream is to be summed with the results of the first stream, the write data read output may provide the first stream channel's data, which may then be summed with the second stream channel's data and written back to the FIFO buffers associated with the first stream using a write command. This supports summing streams using sequential processing.

The transmitting transport buffer 206 includes two data registers, a read pointer, a write pointer, a full bit, and an empty bit. When empty, the read and write pointer may be the same and the full bit is 0. Writing data may go to the register at the write pointer and read data may go from the register at the read pointer. Pushing a write may advance the write pointer. If the write pointer advances to equal the read pointer, the full bit may be set. Popping may advance the read pointer and clear the full bit.

The receiving transport buffer 204 may operate in a similar manner. For example, data received via the transport block 104 may be pushed to a data register at the write pointer and a push operation may advance the write pointer to another data register. Once filled (i.e., once another sample is written to the second data register), the receiving transport buffer 204 may provide a full bit signal of 1 and an empty bit signal of 0 to the audio fabric block 108 (i.e., to request service from one of the processing cores). Additionally, the receiving transport buffer 204 is configured to receive pop commands issued via one of the processing cores to enable the reading of data stored therein.

In the example shown, the second set of audio interfaces 202 includes a receiving transport buffer 208 and a transmittal transport buffer 210 associated therewith. The buffers in the sets receiving and transmittal transport buffers 208 and 210 are similar in structure and function to the receiving and transmittal transport buffers 204 and 206 described herein.

The audio fabric block 108 is communicably coupled to the transport buffers. In a first aspect, the audio fabric block 108 is configured to route various signals (e.g., data, presentation time flags described herein, pop and push commands, empty and full indications, etc.) between the transport buffers and the processing cores to, for example, provide access to the data stored in the transport buffers for further processing. In this regard, the audio fabric block 108 includes a core fabric 212 and register module 214. The register module 214 is configured to store physical stream identifiers in accordance with an address map to facilitate proper data routing between the transport buffers and the processing cores.

In various embodiments, the register module 214 is configured to provide a mapping for sixteen potential logical streams. As described herein, "logical streams" correspond to data stored in association with a logical address map used by the processing cores (e.g., via queue interfaces) to retrieve data from the transport buffers. Logical streams may correspond to received streams (i.e., physical streams received via the audio transport block 104) or transmitted streams (i.e., physical streams transmitted via the audio transport block 104). The mapping may be based on the configuration of the transport buffers. As described with respect to FIG. 4A, a particular transport buffer includes individual buffers grouped together based on a number of channels contained in a physical stream. Accordingly, a physical stream identifier may identify a particular transport buffer, a HOS buffer within the transport buffer, and a number of channels associated with the physical stream. The audio fabric block 108 is configured to receive physical stream identifiers from the processing cores (e.g., via queue interfaces thereon), identify locations within the transport buffers based on the received physical stream identifiers, and enable select lines of routing multiplexers 224 and 226 contained in a core fabric 212 such that signals are routed between the identified locations and the requesting processing core.

In this regard, the core fabric 212 may include a set of comparators configured to enable select lines of the routing multiplexers 224 and 226 responsive to receiving a physical stream identifier stored in a corresponding register of the register module 214. To provide an illustrative example, the processing core 110 may request to service a physical stream stored in the receiving transport buffer 204 by providing an associated physical stream identifier to the audio fabric block 108. Based on the received physical stream identifier, the comparators in the core fabric 212 associated with a register in the register module 214 storing the physical stream identifier enable select lines of the routing multiplexer 226 such that a signal (e.g., POP command) is routed from the processing core 110 to the receiving transport buffer 204. In response to the POP command, the receiving transport buffer pops data stored in the registers identified by the physical stream identifier. Select lines associated with the routing multiplexer 226 are also enabled by the comparators so as to route the popped data to the processing core 110.

Still referring to FIG. 2, the logic of the receiving and transmittal transport buffers 204 and 206 is configured to request presentation times from a presentation timer 222. In some embodiments, the receiving and transmittal transport buffers 204 and 206 are configured to request a presentation time each time data is stored therein. The presentation timer 222 is communicably coupled to a set of sub-sample counters 218. The sub-sample counters 218 are configured to increment upon receipt of the presentation time requests from the receiving and transmittal transport buffers 204 and 206 (and any other transport buffers included in the multi-core audio process). In an example, upon a sub-sample counter associated with the receiving transport buffer 204 reaching a predetermined level (e.g., associated with a sub-sample ratio stored in a data register of the sub-sample counter), the presentation timer 222 is configured to provide a presentation time flag input to the receiving transport buffer 204. In response to the presentation time flag inputs, the receiving and the transmitting transport buffers 204 and 206 are configured to cause the times to travel through the buffer with a stored sample. As such, the receiving transport buffer 204 is configured to provide a presentation time flag to the audio fabric block 108 when the associated sample is popped therefrom. This enables the processing cores identify time differences between the samples in the various physical streams.

The audio fabric block 108 further includes a deadline scheduler 216. The deadline scheduler 216 is configured to maintain a priority list of processing tasks for physical and logical streams. The deadline scheduler 216 is configured to receive the empty and full indications from the transport buffers as inputs and provide a vector to each of the processing cores as outputs. In various embodiments, this vector includes at least three values. A first of these values may include a single bit SVC_REQ signal indicating that at least one stream requires service based on the received empty and full indications. A second of these values may be a single bit PT_FLAG signal, indicating that the at least one stream that requires service is associated with a presentation time. Thus, when the presentation timer 222 asserts the presentation time flag input (e.g., in response to a sub-sample counter 218 incrementing to a predetermined value associated with a desired sub-sample ratio), the presentation time flag input may also be provided to the deadline scheduler 216, causing the PT_FLAG signal to be affirmatively asserted. A third value output by the deadline scheduler 216 may include an physical stream identifier of a stream having a highest priority for service. To identify a stream having the highest priority, the deadline scheduler 216 includes a plurality of stream deadline circuits and compare trees. The stream deadline circuits store deadline values for each of the streams that are updated based on various events occurring within the multi-core audio processor and the compare trees identify streams having the lowest deadline values associated therewith to the processing cores 110, 112, and 114 to facilitate the proper timing of various processing tasks.

In some embodiments, the audio fabric block 108 further includes a stopped stream detectors 220 (e.g., a stopped stream detector associated with each stream). Generally, each stopped stream detector 220 is configured to determine whether a corresponding stream has ceased to be transported via the audio transport block 104 or if a sampling rate for any of the streams has significantly decreased to generate, for example, timeouts for processing an un-transported stream.

Figure 3:
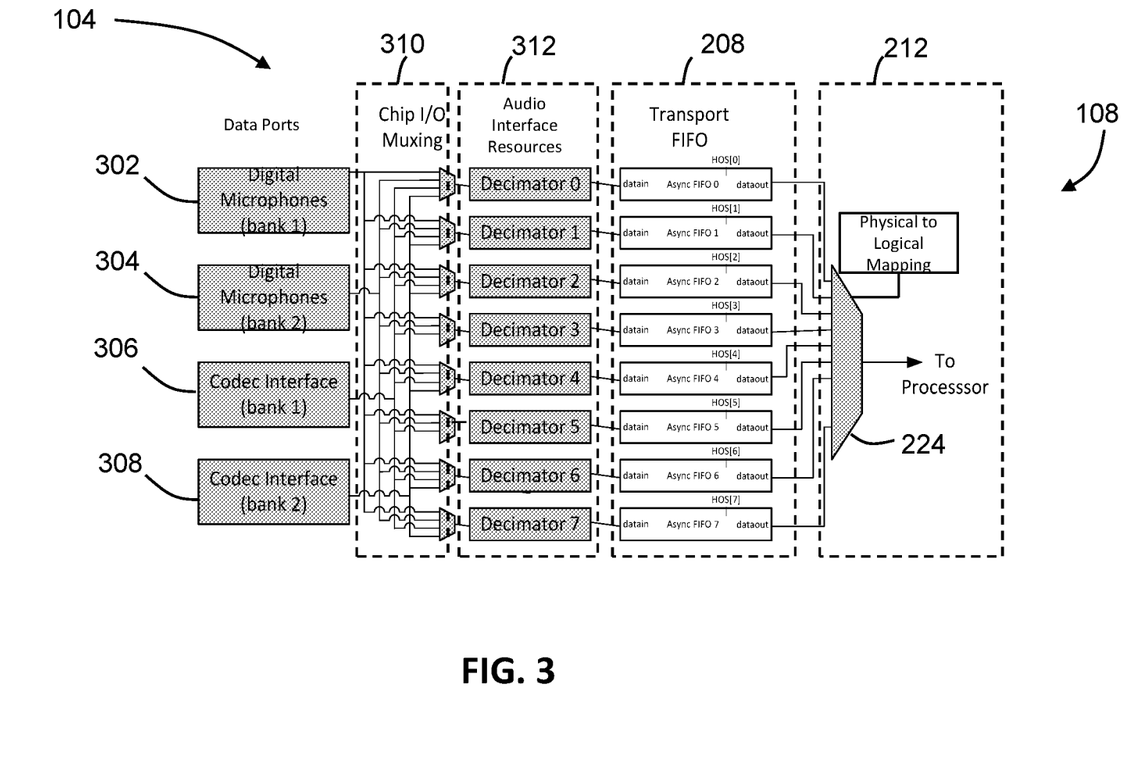
FIG. 3 is a schematic diagram a set of data ports, a multiplexing unit, audio interface resources, a transport buffer, and an audio fabric block of a multi-core audio processor.

Referring now to FIG. 3 a schematic diagram a set of data ports, a multiplexing unit, audio interface resources, a transport buffer, and an audio fabric block of a multi-core audio processor. The elements shown in FIG. 3 may be included in the multi-core audio processor 102 described with respect to FIGS. 1-2. Accordingly, like reference numerals may be used to indicate the inclusion of such like components.

As shown, the audio transport block 104 includes a plurality of data ports 302, 304, 306, and 308. A first data port 302 is communicably coupled to a first bank of digital microphones. A second data port 304 is communicably coupled to a second bank of digital microphones. A third data port 306 is communicably coupled to a first codec and a fourth data port 308 is communicably coupled to a second codec. In various embodiments, each of the data ports 302, 304, 306, and 308 is associated with a PDM audio interface (not depicted) configured to de-serialize the constituent channels of streams received via the data ports 302, 304, 306, and 308.

The audio transport block 104 also includes a plurality of multiplexers 310 and a plurality of audio interface resources (decimation filters) 312. As shown, the plurality of multiplexers 310 includes a multiplexer associated with each one of the decimation filters 312. Additionally, each data port (e.g., via an associated PDM interface) is communicably coupled to each one of the multiplexers. For example, the PDM interfaces may de-serialize a PDM stream received via the first bank of digital microphones into constituent channels and route each one of the constituent channels to a different one of the plurality of multiplexers 310. Thus, by re-configuring select line logic of the multiplexers 310 (e.g., via associated registers), different groupings of adjacent audio interface resources may be allocated to different streams depending on the channels in each stream. In an example, if the first and second banks of digital microphones each include two channels, the two uppermost multiplexers may be configured to route the channels received via the first data port 302 to the two uppermost decimation filters 312. The next two uppermost multiplexers may be configured to route the channels received via the second data port 304 to the next two uppermost decimation filters 312. In another example, if the first and second banks of digital microphones each include four channels, the upper four decimation filters 312 may be allocated to the stream received by the first data port 302 and the lower four decimation filters 312 may be allocated to the stream received by the second data port 304. Thus, the decimation filters 312 are allocable to different streams depending on the application.

Each of the decimation filters 312 is communicably coupled to an asynchronous FIFO buffer of the receiving transport buffer 208. As shown, each of the asynchronous FIFO buffers has an associated HOS bit. The HOS bits represent values stored in a programmable HOS register of the receiving transport buffer 208. As described with respect to FIG. 4A, the HOS bits are programmed such that groupings of asynchronous FIFO buffers are allocated to streams based on the configuration of the plurality of multiplexers 310. In other words, corresponding groupings of decimation filters 312 and asynchronous FIFO buffers are allocated to the streams depending on the number of channels therein. The HOS bits designate one of the channels (e.g., the lowest numbered channel) as the HOS, thus causing the asynchronous FIFO buffer associated therewith to export its read and write pointers to the other buffers allocated to the same stream. This causes the buffers within such a grouping to synchronously store samples received via one of the data ports 302, 304, 306, and 308 so as to maintain the coherency of the input streams.

Figure 4A:
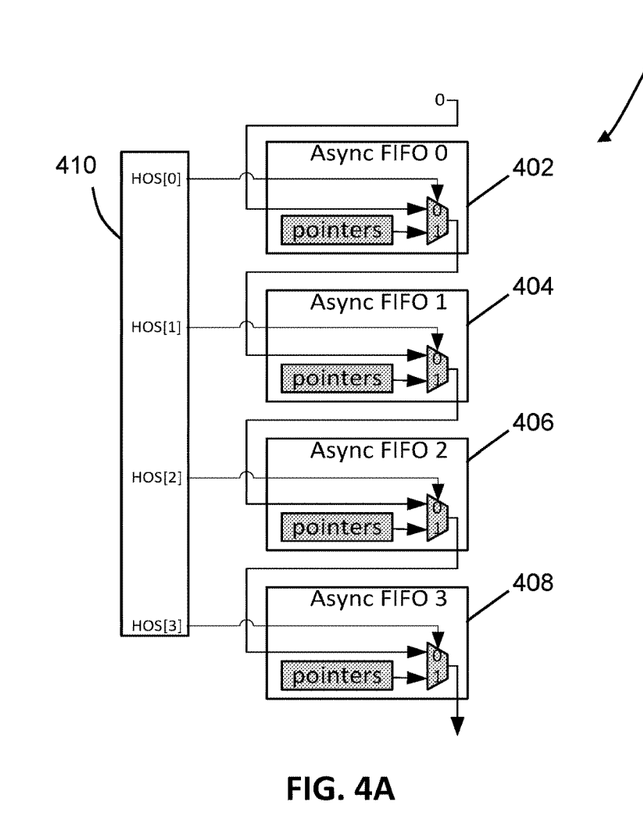
FIG. 4A is a schematic diagram of a string of buffers.

410 was programmed to have a value of HOS[0:3]=1000, then the first buffer 402 would use its own pointers, while the remainder of the buffers 404, 406, and 408 would also use the pointers of the first buffer 402. Thus, whenever data is stored in the first buffer 402, data is synchronously stored into the other three buffers 404, 406, 406. Such an arrangement may be used to maintain coherency in a four channel stream.

In another example, if the HOS register 410 was programmed to have the value HOS [0:3]=1010, the first and second buffers 402 and 404 would both utilize the pointers associated with the first buffer 402, while the third and fourth buffers 406 and 408 would utilize the pointers associated with the third buffer 406. Such an arrangement would facilitate maintaining the coherency of two separate two channel streams (e.g., received via separate data ports).

The receiving transport buffer 208, as described with respect to FIG. 3, includes eight FIFO buffers. These FIFO buffers may be linked to one another in a similar manner as the string of FIFO buffers 400. Thus, the receiving transport buffer 208 may include an eight bit programmable HOS register. This facilitates even greater flexibility in terms of groupings of channels. For example, programming the HOS register to the value HOS [0:7] to 10001010 would generate the groupings of streams identified by the following table.

| Interface Resource | HOS | Stream 0 | Stream 1 | Stream 2 | Stream 3 | Stream 4 | Stream 5 | Stream 6 | Stream 7 |
|---|---|---|---|---|---|---|---|---|---|
| 0 | 1 | Ch0 | — | — | — | — | — | — | — |
| 1 | 0 | Ch1 | — | — | — | — | — | — | — |
| 2 | 0 | Ch2 | — | — | — | — | — | — | — |
| 3 | 1 | — | — | — | Ch0 | — | — | — | — |
| 4 | 0 | — | — | — | Ch1 | — | — | — | — |
| 5 | 0 | — | — | — | Ch2 | — | — | — | — |
| 6 | 1 | — | — | — | — | — | — | Ch0 | — |
| 7 | 0 | — | — | — | — | — | — | Ch1 | — |

Additionally, each of the asynchronous FIFO buffers are communicably coupled the routing multiplexer 224 of the core fabric 212. The core fabric 212 includes physical logical mapping that enables select lines of the routing multiplexer 224 in response to receiving stream identifiers from the processing cores 110, 112, and 114.

Referring now to FIG. 4A, a string of FIFO buffers 400 of a transport buffer is shown. As will be appreciated, various components and connections are left out for the purposes of illustration. The string of FIFO buffers 400 is representative of the individual FIFO buffers contained in any of the transport buffers described herein. As shown, the string of FIFO buffers 400 includes a first buffer 402, a second buffer 404, a third buffer 406, and a fourth buffer 408. Successive ones of the buffers 402, 404, 406, and 408 are linked together via multiplexers. Each multiplexer receives two sets of pointer logic as inputs (e.g., pointer logic associated with different ones of the buffers 402, 404, 406, and 408). Each multiplexer is programmed via a programmable HOS register 410. The HOS register 410 serves as a select input to the multiplexers.

In an example, if a corresponding bit of the HOS register 410 to have an affirmative value (e.g., 1) the associated buffer utilizes its own pointer logic to control the reading and writing of samples thereto. However, if the corresponding bit of the HOS register 410 is programmed to a neutral value (e.g., 0), the associated buffer utilizes the pointer logic used by preceding buffer. To illustrate, if the HOS register With this configuration, physical stream 0 could be a 3-channel codec stream, physical stream 3 another 3-channel codec stream at a different clock, and physical stream 6 a 2-channel digital microphone stream. Each stream may have its own audio clock and rate, but within each stream, the channels will be coherent and easy to demux. Any HOS signal may be used to create any desired grouping of channels.

Figure 4B:
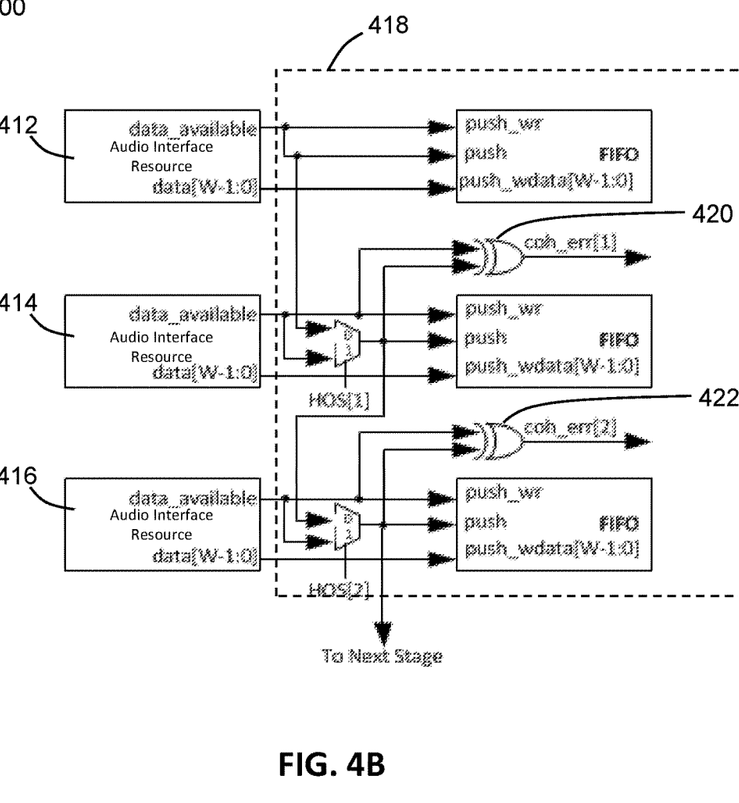
FIG. 4B is a schematic diagram of interconnections between a set of audio interface resources and components of the transport buffer shown in FIG. 3.

FIG. 4B is a schematic diagram of interconnections between a set of audio interface resources and components of a transport buffer. FIG. 4B shows an added benefit of the structure of the transport buffers described herein. As show, data_available outputs of first and second audio interface resources 412 and 414 are provided directly to associated FIFO buffers to control the pushing of write data to data registers at the write pointers. Additionally, the data_available outputs are also provided to a first multiplexer having an associated HOS bit. As such, the first and second audio interface resources 412 and 414 are a first pair of audio interface resources that may be allocated to the same stream. The output of the multiplexer (which may correspond to the data_available output of the first audio interface resource 412 if that channel is designated as a HOS) is provided along with the data_available output of the second audio interface resource 414 to logic circuit 420 configured to determine if the outputs were received at the same time. If not, the logic circuit 420 outputs an error signal to indicate to the processing cores 110, 112, and 114 that the channels are not coherent and that corrective action is needed. A second logic circuit 422 may perform similar actions with respect to the second audio interface resource 414 and a third audio interface resource 416. Thus, the coherency of the channels is able to be verified.

Figure 5:
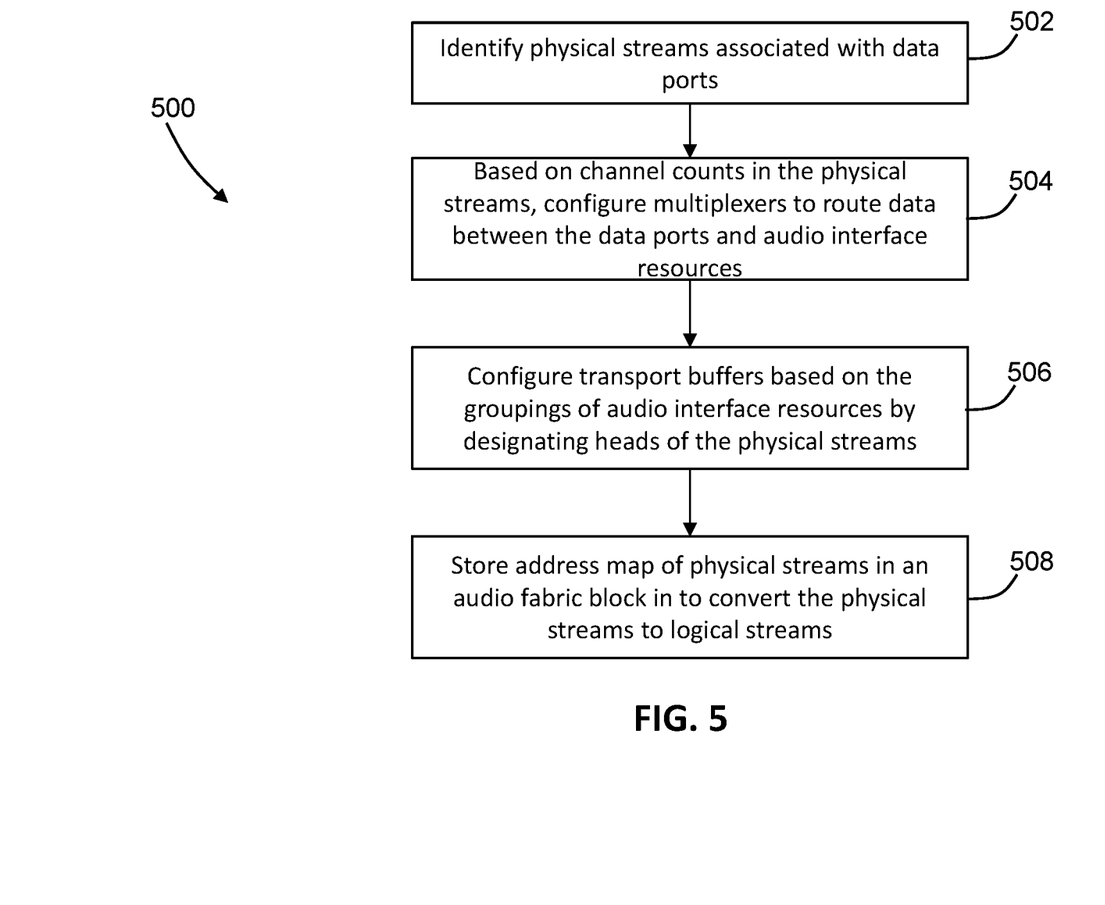
FIG. 5 is a flow diagram of a method of configuring a multi-core audio processor based on physical streams to be processed.

FIG. 5 shows flow diagram of a method 500 of configuring a multi-core audio processor based on physical streams to be processed. The method 500 may include fewer or additional operations depending on the implementation. In an operation 502, physical streams to be associated with data ports of a multi-core audio processor are identified. For example streams may be characterized by protocol (e.g., PDM vs. PCM), sampling rate, channel count, and any number of other characteristics. This determination may be based on an external audio device (e.g., audio storage device, microphone array, codec, etc.) to be coupled to the multi-core audio processor.

In an operation 504, multiplexers are configured to route data between the data ports and audio interface resources of the multi-core audio processor based on the channel counts in the physical streams. In various embodiments, the multi-core audio processor includes a set number of audio interface resources (e.g., counters, decimation filters, etc.) that must be allocated between the physical streams received via the data ports. For example, depending on the channel counts of the physical streams, differently-sized adjacent groupings of audio interface resources may be allocated between the streams. To perform this allocation, select lines of multiplexers coupled to the audio interface resources are enabled to route constituent channels of the streams to the adjacent groupings.

In an operation 506, transport buffers of the multi-core audio processor are configured based on the groupings of the audio interface resources. This is done by designating certain individual buffers contained in the transport buffers as heads of the physical streams, as described with respect to FIG. 4A. Thus, for a contingent grouping of audio interface resources, a corresponding grouping of buffers is configured to synchronously store samples of the stream via exporting of pointers of a designated one of the buffers. This maintains the coherency of the streams.

In an operation 508, an address map of the physical streams is stored in an audio fabric block of the multi-core audio processor to convert the physical streams into logical streams. For example, comparative logic of the audio fabric block may be configured to enable select lines of routing multiplexers communicably coupled to a grouping of buffers associated with a stream in response to receiving a logical stream identifier associated with the stream from one of the processing cores of the multi-core audio processor. This enables the processing cores to access the data stored in the transport buffers and perform various processing tasks thereon.

The flowchart and block diagrams in various Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A multi-core audio processor comprising:
   a plurality of data ports configured to receive and transmit data, wherein a first data port of the plurality of data ports is configured to receive data associated with a first stream;
   a first plurality of audio interface resources configured to perform operations on the data; and
   a multiplexing unit configured to route data between the plurality of data ports and the first plurality of audio interface resources, the multiplexing unit including a multiplexer associated with each of the first plurality of audio interface resources, wherein a first set of multiplexers is configured to route data associated with the first physical stream to a first set of the first plurality of audio interface resources;
   a first transport buffer communicably coupled to the first plurality of audio interface resources, wherein a first set of buffers of the first transport buffer is configured to synchronously store data received from the first set of the first plurality of audio interface resources; and
   a programmable register module configured to store a first logical stream identifier in association with a location identifier of the first set of buffers to route data stored in the first set of buffers to an audio processing core in response to the audio processing core providing the first logical stream identifier.

2. The system claim 1, wherein a second set of multiplexers is configured to route data associated with a second physical stream to a second set of the first plurality of audio interface resources, wherein a second set of buffers of the first transport buffer is configured to synchronously store data received from the second set of the plurality of audio interface resources.

3. The system claim 2, wherein the first transport buffer includes programmable head of stream register identifying a channel of the first physical stream as a head of the first physical stream and a channel of the second physical stream as a head of the second physical stream.

4. The system claim 3, wherein consecutive buffers of the first and second sets of buffers are communicably coupled by, wherein a select line of each of the multiplexers is enabled via a separate bit of the programmable head of stream register.

5. The system claim 2, wherein a third set of multiplexers is configured to route data associated with a third physical stream to a third set of the first plurality of audio interface resources, wherein a third set of buffers of the first transport buffer is configured to synchronously store data received from the third set of the plurality of audio interface resources.

6. The system claim 5, wherein the first, second, and third sets of buffers include numbers of buffers that correspond to numbers of channels in the first, second, and third physical streams.

7. The system claim 1, wherein the first plurality of audio interface resources include decimation filter units, wherein each of the first set of the first plurality of audio interface resources is configured to down-sample a separate channel of audio data contained in the first physical stream.

8. The system claim 1 further comprising:
a second plurality of audio interface resources configured to perform operations on data of a second physical stream received via a second data port, the second physical stream being of a different protocol than the first physical stream, wherein a second set of multiplexers of the multiplexing unit is configured to route data associated with the second physical stream to a subset of the second plurality of audio interface resources; and
a second transport buffer associated with the second plurality of audio interface resources, wherein a set of buffers of the second transport buffer is configured to synchronously store data received from the subset of the second plurality of audio interface resources.

9. The system claim 8, wherein the first physical stream includes pulse code modulation (PCM)-encoded data and the second physical stream includes pulse density modulation (PDM)-encoded data, wherein the first plurality of audio interface resources are decimation filter units and the second plurality of audio interface resources are PCM receivers.

10. A multi-core audio processor, comprising:
a first audio processing core and a second audio processing core having different processing capabilities;
a plurality of data ports configured to receive and transmit data, wherein a first data port of the plurality of data ports is configured to receive data associated with a first physical stream;
a first plurality of audio interface resources configured to perform operations on the data; and
a multiplexing unit configured to route data between the plurality of data ports and the first plurality of audio interface resources, the multiplexing unit including a multiplexer associated with each one of the first plurality of audio interface resources, wherein a first set of multiplexers is configured to route data associated with the first physical stream to a first set of the first plurality of audio interface resources;
a first transport buffer associated with the first plurality of audio interface resources, the first transport buffer including a buffer associated with each one of the first plurality of audio interface resources, wherein a first set of buffers of the first transport buffer is configured to synchronously store data received from the first set of the first plurality of audio interface resources; and
a programmable register module configured to store a first logical stream identifier in association with a location identifier of the first set of buffers to route data stored in the first set of buffers to either the first audio processing core or the second audio processing core based on the first logical stream identifier.

11. The multi-core audio processor of claim 10, further comprising a second transport buffer associated with the first plurality of audio interface resources, the second transport buffer including a buffer associated with each of the first plurality of audio interface resources, wherein a first set of buffers of the second transport buffer is configured to synchronously transmit data received from the first audio processing core or the second audio processing core to a first subset of the first plurality of audio interface resources.

12. The multi-core audio processor of claim 11, wherein a second data port of the plurality of data ports receives data associated with a second physical stream, wherein a second set of multiplexers of the multiplexing unit is configured to route the data associated with the second physical stream to a second subset of the first plurality of audio interface resources, wherein a second set of buffers of the first transport buffer is configured to synchronously store data received from the second subset of the plurality of audio interface resources, wherein a second set of buffers of the second transport buffer is configured to synchronously transmit data received from the first audio processing core or the second audio processing core to the second subset of the first plurality of audio interface resources.

13. The multi-core audio processor of claim 12, further comprising a receiver routing multiplexer communicably coupled to each buffer in the first transport buffer and a transmitting routing multiplexer communicably coupled to each buffer in the second transport buffer.

14. The multi-core audio processor of claim 12, wherein the first and second transport buffers include programmable head of stream registers identifying a channel of the first physical stream as a head of the first physical stream and a channel of the second physical stream as a head of the second physical stream.

15. The multi-core audio processor of claim 14, wherein the first and second sets of buffers are communicably coupled by a series of multiplexers of the first transport buffer, wherein a select line of each one of the series of multiplexers is enabled via a separate bit of the programmable head of stream register.

16. The multi-core audio processor of claim 10, wherein the first set of buffers include asynchronous FIFO buffers.

17. The multi-core audio processor of claim 10, wherein the first audio processing core is a single sample processing core and the second audio processing core is a block processing core.

18. A multi-core audio processor, comprising:
a first audio processing core and a second audio processing core having different processing capabilities;
a plurality of data ports configured to receive and transmit data associated with a first physical stream and a second physical stream;
a plurality of audio interface resources configured to perform operations on the first and second physical streams;
a multiplexing unit including a plurality of multiplexers, wherein a first set of multiplexers of the plurality of multiplexers is configured to route data associated with the first physical stream to a first set of the plurality of audio interface resources, wherein a second set of multiplexers of the plurality of multiplexers is configured to route data associated with the second physical stream to a second set of the plurality of audio interface resources;
at least two transport buffers associated with the plurality of audio interface resources, wherein a first transport buffer of the at least two transport buffers includes a first grouping of buffers, the first grouping of buffers configured to synchronously store data received from the first set of the plurality of audio interface resources; and
a programmable register module configured to store a first logical stream identifier in association with a location identifier of the first grouping of buffers to route data stored in the first grouping of buffers to either the first audio processing core or the second audio processing core in response to the first audio processing core and the second audio processing core providing the first logical stream identifier.

19. The multi-core audio processor of claim 18, wherein the first and second physical streams are of the same protocol, wherein the first transport buffer includes a second grouping of buffers, the second grouping of buffers configured to synchronously store data received from the second set of the plurality of audio interface resources.

20. The multi-core audio processor of claim 18, wherein a second transport buffer of the at least two transport buffers includes a first grouping of buffers, the first grouping of buffers of the second transport buffer configured to synchronously store data received from the second set of the plurality of audio interface resources.

\* \* \* \* \*